(12) United States Patent
Kilibarda et al.

(10) Patent No.: US 8,789,269 B2
(45) Date of Patent: Jul. 29, 2014

(54) MODULAR MANUFACTURING FACILITY AND METHOD

(75) Inventors: Velibor Kilibarda, Birmingham, MI (US); David Reid, Commerce Township, MI (US); Daisy Red, Southfield, MI (US)

(73) Assignee: Comau, Inc., Southfield, MI (US)

( * ) Notice: Subject to any disclaimer, the term of this patent is extended or adjusted under 35 U.S.C. 154(b) by 528 days.

(21) Appl. No.: 12/986,449

(22) Filed: Jan. 7, 2011

(65) Prior Publication Data

US 2011/0209321 A1 Sep. 1, 2011

Related U.S. Application Data

(60) Provisional application No. 61/293,017, filed on Jan. 7, 2010.

(51) Int. Cl.
*B23P 19/00* (2006.01)
*B23P 11/00* (2006.01)

(52) U.S. Cl.
USPC ............. 29/791; 29/33 P; 29/563; 29/824; 29/823; 29/822; 29/430

(58) Field of Classification Search
USPC .......... 29/33 P, 563, 700, 791, 429, 430, 431, 29/822, 823, 824
See application file for complete search history.

(56) References Cited

U.S. PATENT DOCUMENTS

| | | | |
|---|---|---|---|
| 4,659,895 A * | 4/1987 | Di Rosa | 219/79 |
| 4,872,419 A * | 10/1989 | Blankemeyer et al. | 118/713 |
| 5,285,604 A | 2/1994 | Carlin | |
| 5,853,215 A * | 12/1998 | Lowery | 296/24.32 |
| 5,864,991 A * | 2/1999 | Burns | 52/67 |
| 6,132,509 A * | 10/2000 | Kuschnereit | 118/64 |
| 6,253,504 B1 | 7/2001 | Cohen et al. | |
| 6,325,435 B1 | 12/2001 | Dubuc | |
| 6,349,237 B1 * | 2/2002 | Koren et al. | 700/96 |
| 6,513,231 B1 | 2/2003 | Hafenrichter et al. | |
| 6,651,392 B2 * | 11/2003 | Ritzal | 52/36.2 |
| 6,688,048 B2 | 2/2004 | Staschik | |
| 6,705,001 B2 | 3/2004 | How et al. | |
| 6,916,375 B2 * | 7/2005 | Molnar et al. | 118/302 |
| 6,990,715 B2 | 1/2006 | Liu et al. | |

(Continued)

FOREIGN PATENT DOCUMENTS

| | | | | |
|---|---|---|---|---|
| CA | 2718907 A1 | 9/2009 | | |
| DE | 19940992 A1 | 3/2001 | | |
| WO | WO 0068117 A1 * | 11/2000 | | B65K 41/00 |

OTHER PUBLICATIONS

Mats Jackson and Abedullah Zaman, Factory-In-a-Box-Mobile Production Capacity of Demand, International Journal of Modern Engineering vol. 8, No. 1 Fall 2007.

(Continued)

*Primary Examiner* — Essama Omgba
(74) *Attorney, Agent, or Firm* — Young Basile Hanlon & MacFarlane P.C.

(57) ABSTRACT

A modular manufacturing facility and method of construction includes a plurality of service and equipment modules which are readily sized and oriented to be packaged, shipped to a desired location, assembled and connected to local resources to form a fully operational assembly or build facility substantially or wholly independent of any resident building structure at the selected site.

15 Claims, 7 Drawing Sheets

(56) References Cited

U.S. PATENT DOCUMENTS

| | | |
|---|---|---|
| 7,490,710 B1* | 2/2009 | Weskamp et al. .......... 198/345.3 |
| 7,845,121 B2 | 12/2010 | Wobben |
| 8,097,451 B2 | 1/2012 | Gaalswyk |
| 8,127,687 B2* | 3/2012 | Spangler et al. ................ 104/89 |
| 8,201,723 B2* | 6/2012 | Kilibarda ..................... 228/49.1 |
| 8,308,048 B2 | 11/2012 | Kilibarda |
| 8,360,225 B2* | 1/2013 | Spangler et al. .......... 198/345.3 |
| 8,474,132 B2* | 7/2013 | Li et al. ........................... 29/791 |
| 8,474,683 B2* | 7/2013 | Kilibarda ..................... 228/47.1 |
| 2002/0129566 A1* | 9/2002 | Piccolo et al. ................. 52/79.1 |
| 2003/0175429 A1* | 9/2003 | Molnar et al. ................ 427/307 |
| 2005/0153075 A1* | 7/2005 | Molnar et al. ................ 427/299 |
| 2008/0022609 A1 | 1/2008 | Franco et al. |
| 2008/0178537 A1* | 7/2008 | Spangler et al. .............. 52/36.1 |
| 2009/0056116 A1* | 3/2009 | Presley et al. ................... 29/791 |
| 2009/0277747 A1* | 11/2009 | Spangler et al. .......... 198/345.3 |
| 2009/0277748 A1* | 11/2009 | Spangler et al. .......... 198/345.3 |
| 2009/0277754 A1* | 11/2009 | Spangler et al. .............. 198/617 |
| 2009/0277755 A1* | 11/2009 | Spangler et al. .............. 198/617 |
| 2009/0279992 A1* | 11/2009 | Spangler et al. .............. 414/562 |
| 2009/0300998 A1 | 12/2009 | Ablett |
| 2011/0047788 A1* | 3/2011 | Immekus et al. ............... 29/729 |
| 2011/0047791 A1* | 3/2011 | Ferenczi et al. ................ 29/791 |
| 2011/0252719 A1 | 10/2011 | Wallance |
| 2012/0005968 A1 | 1/2012 | Patino |
| 2012/0222277 A1* | 9/2012 | Spangler et al. ............. 29/401.1 |
| 2012/0274000 A1* | 11/2012 | Gaiser ........................ 264/328.8 |
| 2013/0026002 A1* | 1/2013 | Spangler ...................... 198/340 |
| 2013/0109291 A1* | 5/2013 | Holtz et al. ................... 454/187 |

OTHER PUBLICATIONS

Notification of Transmittal, the International Search Report and the Written Opinion of the International Searching Authority dated Jan. 28, 2013, from the corresponding International Application No. PCT/US2011/020486 filed Jan. 7, 2011.

* cited by examiner

MODULAR MANUFACTURING FACILITY AND METHOD

CROSS-REFERENCE TO RELATED APPLICATIONS

This application claims the benefit of priority to U.S. provisional patent application Ser. No. 61/293,017 filed Jan. 7, 2010 the entire contents of which are incorporated herein by reference.

TECHNICAL FIELD

This invention generally pertains to manufacturing facilities. The invention has advantageous use in manufacturing facilities used to build commercial and passenger vehicles.

BACKGROUND

There is increased pressure on original equipment manufacturers (OEM's) and the suppliers of equipment and services to the OEM's to quickly adapt to the changing needs of the consumers. Vehicle manufacturers have long invested substantial sums of money in building permanent manufacturing facilities which can quickly become obsolete or have to be shut down due to decreases or shifts in consumer demands away from the particular vehicle a particular plant was manufacturing. The capital investment in such permanent facilities and dedicated equipment therein is then lost or greatly under utilized until a new use can be found or the facility retooled for an alternate purpose.

There is also significant pressure and commercial motivation to produce manufacturing facilities that are environmentally green or friendly having minimal impact on the surrounding environment throughout the life of the facility. Conventional assembly plants have typically required substantial infrastructure build up altering the surrounding landscape and using substantial resident natural resources to power and sustain the energy needs of the facility.

It would be advantageous to have a modular manufacturing facility that is portable, easily transported across land or sea, requires minimal plant infrastructure at the site and which is highly efficient and environmentally friendly to the surrounding area.

BRIEF SUMMARY

The present invention generally includes a modular manufacturing facility and method for constructing a modular manufacturing facility. In one example, the modular manufacturing facility is for use in building passenger vehicle sheet metal body structures, each body commonly referred to as a Body-in-White (BIW). In one example of the modular manufacturing facility, a fully operational manufacturing or assembly line is shipped, assembled and installed at a remote location. The remote location requires much less building infrastructure than traditional plants. In one example, only a supported roof or ceiling is provided with a firm and substantially continuous floor or support surface. The preselected service and equipment modules are unpacked, assembled to form an assembly line suitable for the vehicle to be built and the respective modules are plugged or connected to a source of power or other resource that is provided from one of the other modules or is resident at the assembly location site. For example, electrical power or water may exist at the chosen site or these needed resources could be supplied to the site in respective modules, for example power generators and self-contained water circulation systems.

In an alternate example, an exterior shell of a building including an enclosed ceiling and walls may be provided along with a firm support surface. The modules are installed and connected in a similar manner without the need for conventional assembly plant heavy infrastructure such as load bearing overhead trusses and site altering features such as recesses or pits in the floor to house and secure heavy infrastructure. The modular manufacturing devices are installed on the existing floor and support surfaces and plugged into supplied or modular service sources for operation.

In one example of a method for constructing a modular assembly facility, a build site is selected which includes an exterior shell of a structure or building and a firm support surface. The device to be manufactured or assembled, for example a sheet metal BIW skeleton of a passenger vehicle, is identified and the appropriate service/equipment modules are selected to provide the necessary build functions or operations. In an early step, the capacity of the plant is identified and the number of service modules is determined to be commensurate with the capacity needed.

The modules are shipped to the facility location site and assembled to form an operational assembly line. In a preferred example, the modules are connected to and supported by the resident floor or support surface existing at the site so minimal or no additional heavy infrastructure is needed at the site. In alternate applications, light infrastructure such as light duty overhead trusses and vertical support columns, may be employed to suit the particular application. The respective service modules are then operably connected to a source needed for operation, for example an electrical power source to form a fully operational build line. The modules may be connected to resident resources, for example a power supply existing at the site, or may be connected to other modules which supply the required resource, for example a portable power generator.

In one example, discrete modular assembly stations are defined on the facility floor or support surface along the assembly lines. If production capacity is increased after initial facility fabrication, additional modular assembly stations and equipment service modules may be relatively easily added to support the increase. If production is decreased, assembly modular assembly stations and/or groups of service modules can be disconnected, transferred to another location and repurposed to build the same or a different product at a location around the globe.

In one example, a high level of recycling of resources are used to minimize the impact on the surrounding environment or geographic landscape. For example, water that is heated during welding or other manufacturing operations is used to assist in heating the facility or power other aspects of the facility.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
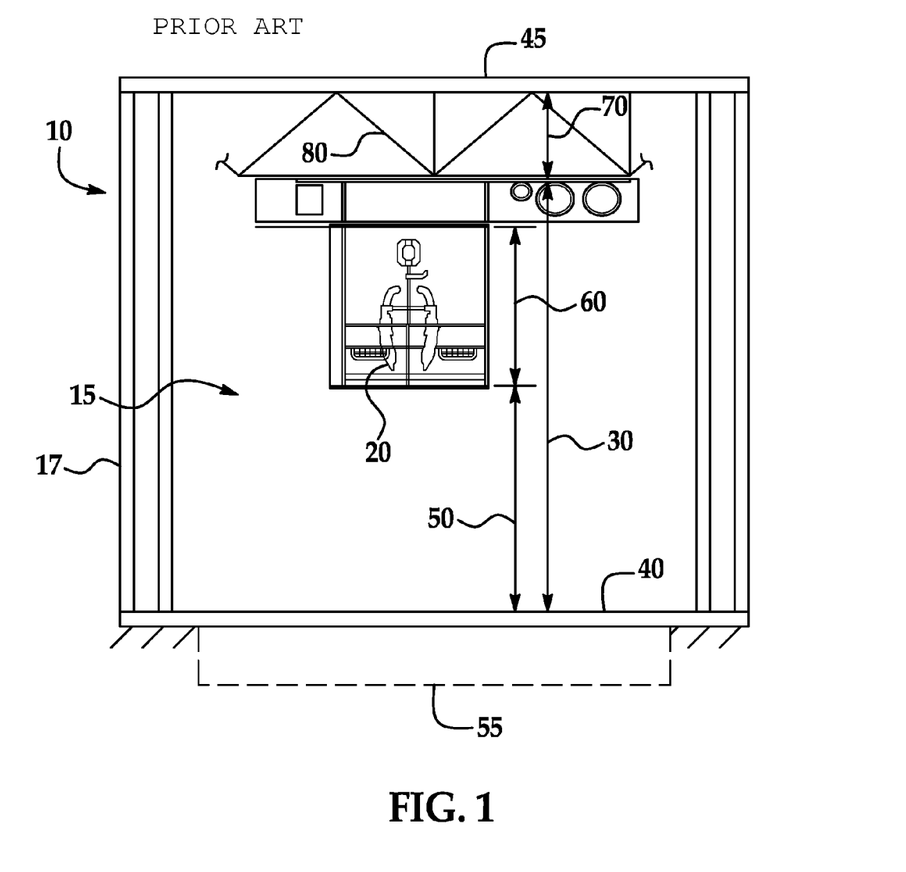
FIG. 1 is schematic end view of an example of a conventional or prior art build line with building facility infrastructure.
Figure 2:
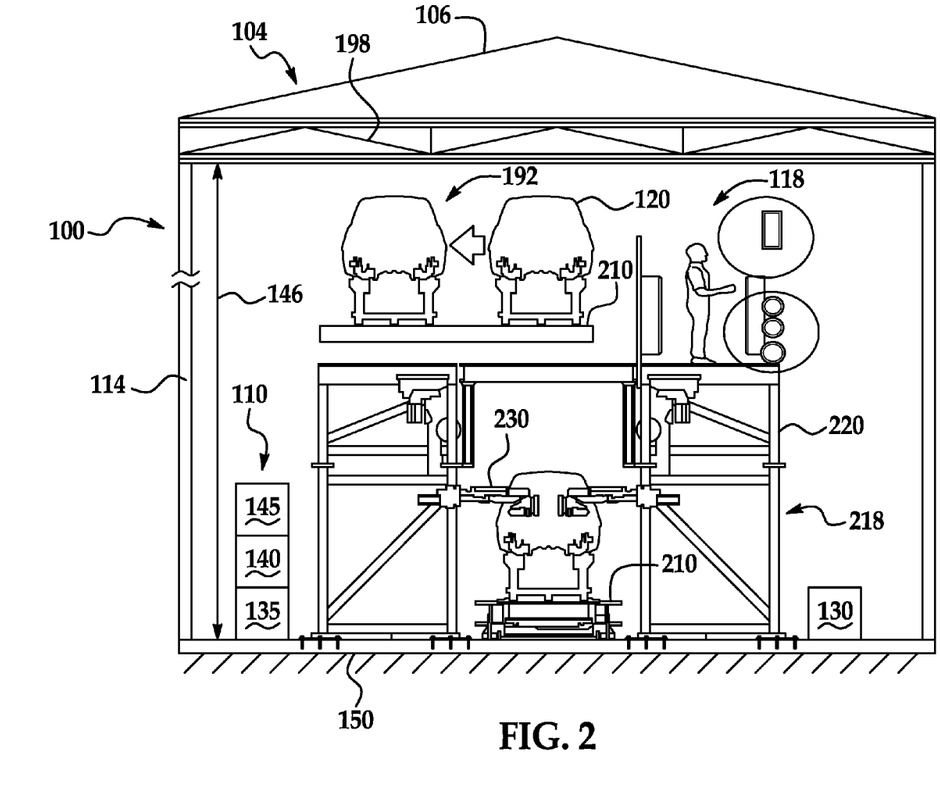
FIG. 2 is a schematic end view of an example of the present invention modular building facility build line including a modular assembly station and three adjacent service equipment modules and exemplary light duty infrastructure.
Figure 3:
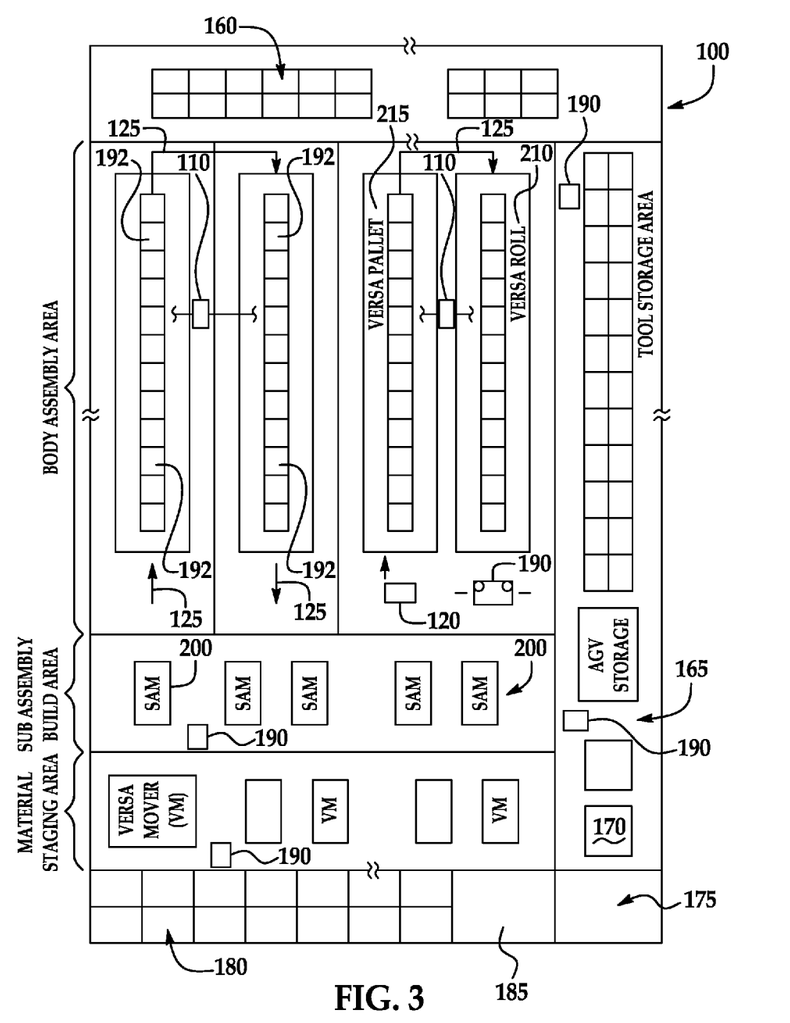
FIG. 3 is a schematic plan view of a modular build facility floor plan showing exemplary assembly lines, modular assembly stations and equipment and service modules.
Figure 4:
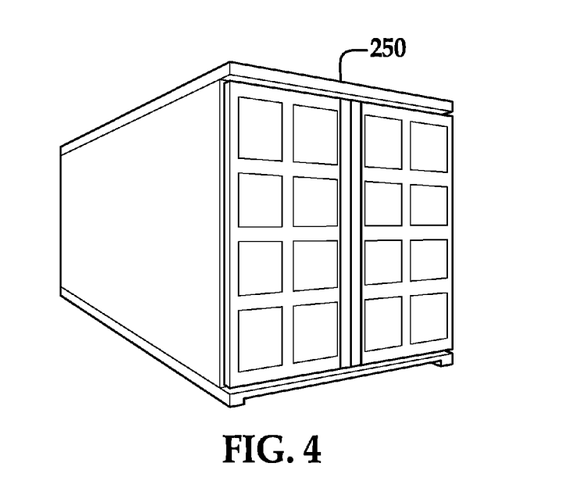
FIG. 4 is a perspective view of examples of common cargo shipping containers that may be used with the present invention to transport service modules and light duty facility infrastructure.
Figure 5:
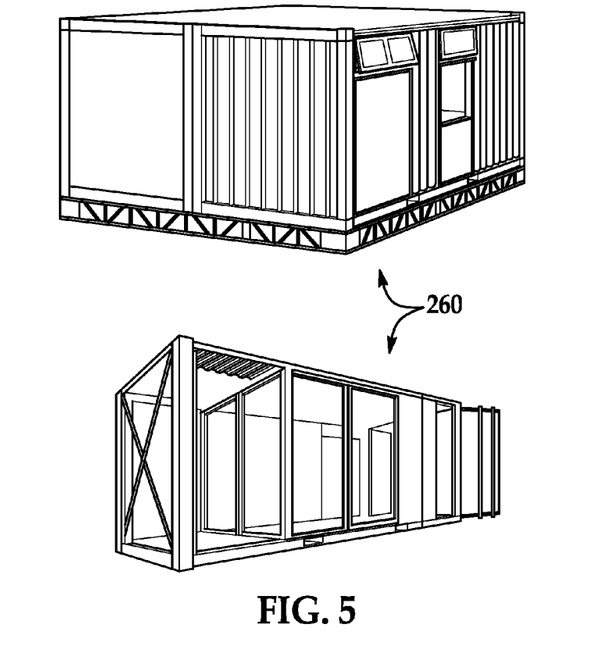
FIG. 5 are perspective views of examples of alternate or recyclable uses for common cargo shipping containers shown in FIG. 5 following end of use with the present invention.

An example of a prior art manufacturing facility and assembly line is illustrated FIG. 1. Examples of a modular manufacturing facility of the present invention and an example of a method of fabricating and use of the modular manufacturing facility in an exemplary use for assembling vehicular sheet metal bodies, each body commonly referred to as a body-in-white (BIW) are shown in FIGS. 2-4. Examples of cargo shipping containers usable to transport exemplary service and equipment modules for use in the modular manufacturing facility are shown in FIG. 4 and examples of alternate uses of common cargo shipping containers following use or end of service life are shown in FIG. 5.

Referring to FIG. 1 depicting prior art, a common or conventional end view of an assembly line in the area of the assembly bay is shown. In the example, it is conventional for a manufacturing and assembly build facility be a permanent heavy duty building structure with a concrete foundation, a permanent building exterior including roof and walls is used. In order to accommodate the traditional manufacturing operations for a passenger vehicle or sheet metal skeleton or BIW 20, permanent and heavy duty infrastructure 15 including hundreds of heavy I-beam support columns 17 supporting the building walls are roof are needed. In such conventional facilities, it is common that a space or height 30 of about 28 feet from the assembly plant concrete floor 40 to the plant ceiling 45 is needed to provide adequate clearance under the roof trusses to assemble and maneuver the body 20 through the bay, assembly line and facility.

As shown, in conventional facilities, in order to support permanent conveyors and other assembly equipment, a heavy duty overhead truss 80 is often needed. It is common for such heavy duty trusses 80 to be six (6) feet (72 inches) or more in height to support anticipated loads. It is further common to need a height 50 of at least 25 feet from the floor 40 to the bottom of the truss 80 to provide necessary clearance for the assembly equipment, including permanent scaffolding, build platforms and other frames (not shown) typically used for build operations.

On conventional plant floors 40, numerous deep recesses or pits 55 are needed in the concrete floor to secure the heavy infrastructure in, for example foundations (not shown) and provide additional clearance for movement or passage of vehicle bodies 20 through the facility. Conventional facilities typically employ permanent and dedicated equipment to power and provide the necessary resources for a commercial plant environment, for example, power transmission into the plant, pressurized air equipment needed for pneumatic tools, water circulation to cool tools, and heating, ventilation and cooling systems (HVAC) for plant environmental quality (not shown).

All of the conventional heavy duty and permanent facility structures and equipment traditional require long lead times to prepare the permanent facility and require substantial initial investment to build and set up. On cessation of plant operations, it is common that due to the permanent and dedicated nature of the permanent facility, these facilities and equipment are decommissioned and are unsuitable to be repurposed or used for other builds. If conversion of the permanent plant is required, a substantial investment, tear down and reconstruction of the facility and equipment is required. Due to the time and cost to do so, plants are simply closed wasting the spent resources and new facilities are built.

Referring to FIGS. 2-6, examples of a modular manufacturing facility 100 for an exemplary process 300 to construct a modular manufacturing facility to build vehicular body-in-white structures 120 along an assembly or build line 125 are shown. One objective of the modular manufacturing facility 100 is to provide a fully-operational manufacturing facility through use of discrete equipment and portable, modular assembly stations 192 and modular and portable service devices or modules 110 which when transported to the desired location, are temporarily installed, integrated and connected to a new or existing light duty outer shell or building structure 104 to support the manufacturing and assembly work to be done as well as the workforce assigned to the facility to operate it. It is understood that in certain geographic locations, an existing exterior shell or building may not be provided and may not be necessary for the fabrication and operation of the modular structure 100 and process 300.

The modular assembly stations 192 and separate equipment and service modules 110 are designed in size and shape, or may be disassembled for packaging in standard cargo containers 250 and are relatively easy to transport anywhere in the world to meet a new or changing manufacturing demands of a business. In a preferred example, the modules 110 are sized and shaped to form a common cargo container 250 so a separate or single purpose cargo container 250 is not needed. The portability and mobility of the modular assembly stations 192 and modular manufacturing service equipment 110, for example conveyors 210, frame scaffolding 218, lift mechanisms (not shown), robots 230, welding equipment 222, positioning and clamping fixtures and other tooling (not shown), provide flexibility to relatively quickly repurpose or tear down and relocate so as to greatly reduce the percentage of disposable assets which go unused or wasted in prior art manufacturing facilities.

In one example shown in FIG. 2, the facility 100 requires only an exterior building shell 104, for example an empty warehouse (not shown), with an upper portion. Upper portion 106 can be a rigid roof supported with relatively light duty vertical supports or columns to support the roof. Upper portion can be a simple rigid or soft canopy or event a tent structure to simply protect or shield an interior 118 from the environmental elements from above, for example, sun or rain in warm tropical areas. Exterior walls (not shown) to further enclose the interior 118 may be used in more variable or harsh environments to provide a climate controlled work facility. It is a design aspect for facility 100 to rely very little, if at all, on the exterior shell 104 and conventional plant heavy duty infrastructure to relatively quickly fabricate or assemble the necessary equipment for a fully operational facility.

As shown, in a preferred example, modular facility 100 includes a firm rigid support surface or floor 150. Support surface 150 is preferably a concrete, paved or tiled surface and is continuous, or substantially continuous, to provide for an uninterrupted path for assembly line 125 and movement of the vehicle bodies 120, or other devices being built or assembled. In the example, minimal or no conventional recesses or pits need be dug through the support surface 150 greatly reducing facility build out, time and capital investment. Depending on the predetermined vehicle being built, the build processes and equipment needed, support surface 150 may vary, for example may have local elevation deviations known by those skilled in the field.

In a preferred example, the modular assembly stations 192 include components and infrastructure suitable for building or assembling the selected device or vehicle in sequential build stations along an assembly line. This modular and portable infrastructure may include scaffolding 218, conveyors 210, component and subassembly fixtures and clamps, other tooling needed for a particular build operation, and other devices and systems appropriate for a particular build or assembly operation known by those skilled in the art. Each modular assembly station may include different modular and portable equipment for successive building or assembly of a device or vehicle. In a preferred example, the device is a vehicle BIW structure. The portable and modular equipment in the assembly build stations 192 and the service and equipment modules 110 discussed further below, are preferably supported and secured as necessary to existing or resident support surface 150.

Referring to FIGS. 2 and 3, in one example, the modular manufacturing facility 100 may include discrete service and equipment modules for:

1. Electrical sub-station 145;
2. Weld-water or other circulation and cooling system 135;
3. Compressed air 140;
4. Tooling 130;
5. Facility maintenance crib 160;
6. HVAC (not shown);
7. Automated guided vehicle or other transport device staging (165)
8. Battery charging 170;
9. Waste disposal 175;
10. Business office 180; and
11. Restroom facilities 185.

These modules 110, in combination with other manufacturing and assembly equipment referenced above, provide the fundamental equipment and services needed for assembly of vehicular BIW structures 120, for example. Although described for use in building BIW vehicle structures, other devices or structures could be manufactured and/or assembled. It is further understood that additional service modules and equipment not specifically identified that are known by those skilled may be used without deviating from the present invention.

In the preferred example, the various manufacturing and service modules 110 are individually shipped, located and installed under or into the exterior shell 104 (if needed at all depending on the application) and connected as necessary to the support surface 150. To the extent that any relatively light duty infrastructure, for example a light duty, low profile truss 198, the appropriate modules 110 and equipment, for example tooling fixtures (not shown) and robots 230 are connected thereto to suit the particular application.

In the example shown in FIG. 2, an exemplary discrete modular assembly station 192 is shown. As shown in FIG. 3, a plurality of sequential modular assembly stations 192 are shown along assembly line 125 in the body assembly area. Each modular assembly station 192 includes respective modular equipment, for example scaffolding 218 and robots 230 shown in FIG. 2, and tooling (not shown) that are particular to that build station to carryout a particular build operation on, for example, vehicle body 120. As shown in FIGS. 2 and 3, these modular assembly stations 192 are connected to (or supported by) the appropriate equipment service modules 110. Through this process and organization, the initial determined build capacity of the facility 100 can be accommodated. Once the facility is operational, additional assembly bays or modular assembly stations 192, or coordinated groups of assembly stations 192, can be relatively easily added through supply of additional modular stations 192 and service modules 110 to scale and increase the capacity demand. Similarly, if capacity is reduced long term, the modular assembly stations 192 and associated service modules 110 can be removed and repurposed at the same facility 110 or shipped to another geographic location to build the second or different vehicle body 120 thereby repurposing, reusing and recycling the capital equipment. It is understood that other sized and oriented assembly stations 192 can be used. Further, assembly stations 192 can further be used in other assembly areas of the plant, for example in the subassembly area and material staging areas shown in FIG. 4. Each station 192 in each different area would have different modular equipment and service modules 110 to serve the particular needs in that area. All modular stations are still designed to be portable and modular as described herein.

Referring to FIG. 2, an end view of a modular assembly station 192 is illustrated. In the example, a reduced height 196 of about 24 feet is needed from the plant floor 150 to provide the necessary clearance above the BIW structure 120 as generally shown. Due to the modular system, the assembly equipment is substantially, if not wholly, supported by the plant floor 150 requiring a much smaller and less robust upper truss 198 compared to the prior art truss 80 shown in FIG. 1. The smaller height 196 and reduced truss 198 provide at least advantages in a lower facility ceiling which reduces additional floor to roof or ceiling space needed by the conventional facility providing advantages of a smaller facility, reduced lighting, heating and cooling costs as well as initial investment. In the example shown, modules 110 and other equipment can substantially, if not wholly, be mounted directly to, or simply supported by the support surface 150 which can be concrete, steel, wood or other relatively smooth and rigid floor eliminating the need for robust overhead trusses used in prior art facilities for overhead conveyors or gantry cranes as well as prior trenches and pits commonly used to secure or recess equipment into the floor.

In the examples shown in FIGS. 2 and 3 to assemble a BIW 120, portable and modular equipment provided by Comau Inc., assignee of the present invention, may be used in the assembly build stations 192 to suit the particular application. For example, such a system may include a palletized body assembly system including an equipment or component moving device 199 (for example a VersaMover, a trademark of Comau Inc.). Mover 199 can take the form of or be used with an automated guided vehicle (AGV) 190 useful for moving components and equipment around a facility. Other portable and modular equipment, for example subassembly machines (SAM) 200 (a trademark of Comau Inc.) used to assemble and/or weld smaller subassemblies (for example vehicle A-pillars, doors etc.) used later in the larger BIW. Other modular transfer devices that may be suitable and useful, for example, to move partially assembled components between assembly stations, may be used. A suitable example of such transfer device is a VersaRoll device 210 (trademark of Comau Inc.) In the example illustrated, a pallet body assembly device 215 may be used to support and hold the BIW 120 in place during the assembly operations. A suitable example is a VersaPallet device (trademarks of Comau Inc.). Other portable and modular devices and equipment known by those skilled in the field may be employed depending on the device or vehicle to be assembled and the resources available at the selected facility location.

These modular assembly station 192 build and transfer devices, or variations and combinations thereof, as well as a body framer (not shown) or support or scaffolding structure 218 and robots 230 to suit the particular application, may be used. One object of using these or similar devices in the present invention is to provide such modular and portable equipment that does not require heavy duty load bearing or robust building structures, for example large overhead trusses to greatly reduce the capital requirements of the resident building structure itself. Examples of one or more of these structures, or structures which function similar thereto, can be found in U.S. patent application Ser. Nos. 12/262,722; 12/269,955; 61/196,427; 10/402,467; 61/358,668 and U.S. Pat. Nos. 6,554,119; 6,799,673; 6,966,427 and 7,108,189 all of which are incorporated herein by reference. Other devices for assembling BIW structures, and positioned in different locations and orientations, may be used as known by those skilled in the field. One advantage of the modular manufacturing and service devices 110 is that in the event of maintenance or repair, a replacement module can easily by put in place while a particular module is examined or repairs so as to not unduly delay production.

Referring to FIG. 5, it is contemplated that one of more of the modules 110, are preferably built into or configured in the general shape and orientation of an ocean and/or rail car shipping container 250. For example, a water circulation unit including a pump, filter and reservoir can be semi-permanently secured or fabricated into a hollow cargo container so the operational module is easily maneuvered and shipped like an ocean shipping container. In the fabricated or integrated form, containers/modules can more easily be shipped and transported into facility 100 and positioned next to an assembly bay to provide, for example, water (135) and power (145) for welding operations and compressed air (140) for pneumatic tools etc. By having these modules in the form of shipping containers 250, this only increases the portability in the units and flexibility to ship and install the modules in the facility 100. This in part greatly reduces capital investment in the resident building and permits ease of tear down and extraction of the modular equipment for transport to another location. Alternately, the respective modules 110 can be packaged and secured inside common cargo carriers 250 and shipped. Typically, such cargo carriers are eight (8) feet wide by eight (8) feet high and either twenty (20) or forty (40) feet in length.

As shown in FIG. 5, it is contemplated that where conventional or single purpose cargo containers are employed, containers 250 can be redesigned or repurposed into alternate purpose structures 260 at the new destination or other locations to reuse or recycle this capital equipment.

Referring to the exemplary list of modules above, the battery charging module 170 is useful for recharging, for example, automated guided vehicles (AGV) 190 used in assembly facilities to transport component vehicle parts to be assembled, tooling or other items necessary for efficient plant operation. One or more waste management modules may be used to dispose of debris, chemicals or other materials used during the manufacturing and assembly operations. These and the other identified modules may be assembled and connected to an existing building or building shell and connected to, for example, the electrical sub-station 145 to a resident power source at the location. The sub-station then providing all the necessary electrical equipment and transfer of power to support several modular assembly stations 192 along one or more assembly lines 125 as shown in FIG. 3. A similar connection is contemplated for the HVAC to provide heating, cooling and ventilation for the facility on connection to a resident power source or a source provided by the modular facility itself, for example through generators etc. Where the modular manufacturing facility 100 provides building or outer shell itself (not shown) advantages are achieved though, for example, prefabricated smaller trusses 160 which can also be disassembled packed and shipped for reassemble and/or repurposing at a new location.

In addition to the modular assembly stations 192 and service and equipment modules 110 pertaining directly to assembly of the device along an assembly line 125 or other build component areas in the facility, other portable modules supporting the workforce including an office module providing for example, work stations, cubicles, offices and desks as well as worker restrooms and other necessary and discretionary areas (not shown) may be employed as portable and modular units to suit the particular application and performance requirements. Other modular units not shown or described known by those skilled in the field may be used.

Figure 7:
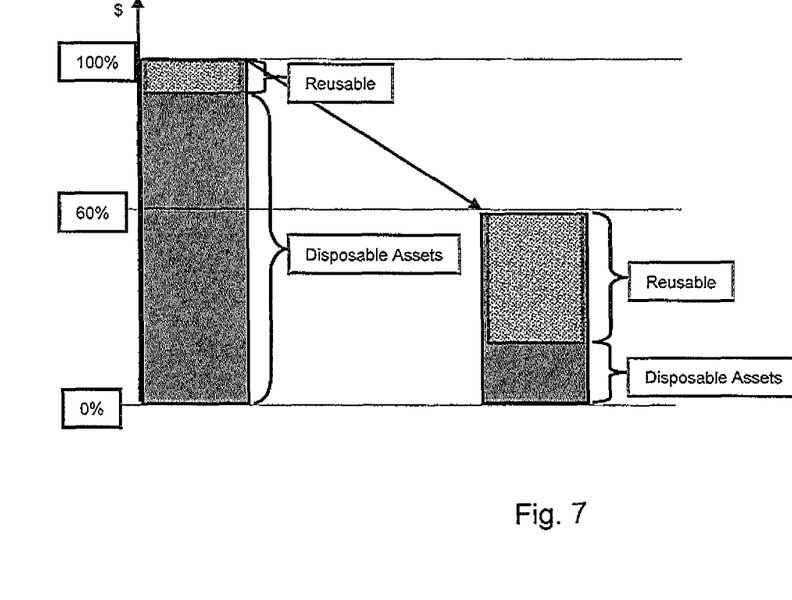
FIG. 7 is a chart summarizing some of the advantages of the modular manufacturing facility in an exemplary use for vehicle body-in-white assembly.

Referring to FIG. 7, an illustration schematically shows the increase of efficiency in asset utilization realized by present invention. The column on the left generally shows conventional use of disposable and reusable assets. The column on the right is representative of estimated asset use and reuse through the present invention. The most significant aspect of the chart is the increase in reusable assets over conventional designs and methods. The list below identifies further benefits and advantages of the devices and methods of the present invention.

Figure 8:
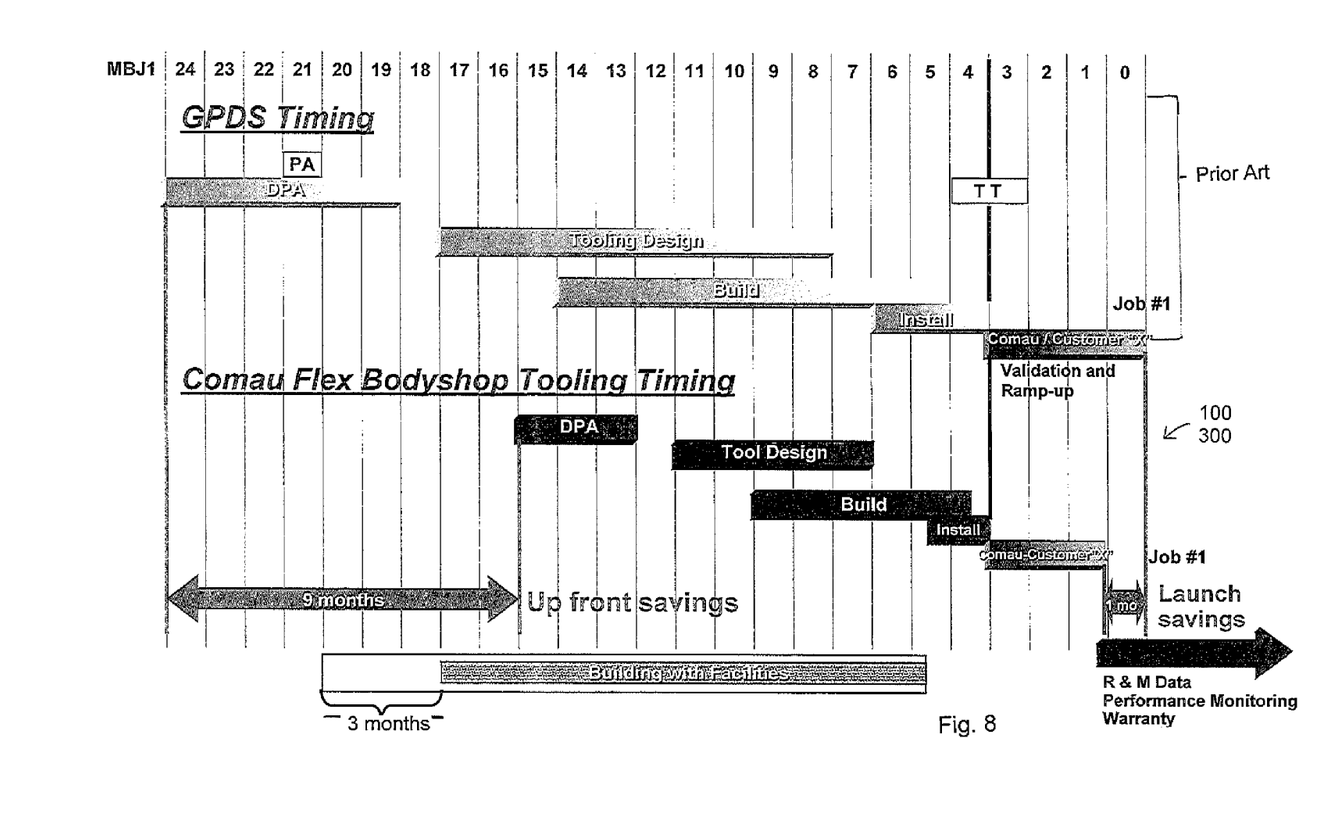
FIG. 8 is a schematic time chart comparing a prior art timetable (on top) versus an example of a timetable for the present invention.

1. Increased Building Column Span
   Ease of Equipment placement
   Less column interferences
2. Light Weight Truss
   All floor supported Tooling
   No Truss supported Conveyors
3. Modular Facility Services:
   Electrical Sub-station Module
   Weld Water System Module
   Compressed Air System Module
   Modular Office, Rest rooms and Maintenance Crib facilities
4. Energy Preservation (Green Facility):
   Smaller space and Lower height (HVAC volume reduction)
   Energy recycling (weld water system for heating)
   Solar panel and Geo thermo energy generation
5. Modular Construction for Portability:
   Ease of expansion—Additional bays
   Ease of relocation (Structural modules, BIW Modular Services)
6. Timing Schedule:
   Delays funding releases, building Design reuse
   Compressed installation schedule (modular build)
7. Cost Reduction and Asset Reuse:
   Site preparation (permits)
   Light Truss construction, Fewer Building Footings
   Modular Building Services: Electrical Buss, Headers (Air, Water), Fume Extraction
   "Parking lot & Umbrella" approach Referring to FIG. 8, a graph is provided to illustrate additional advantages in the timeframe comparing a common prior GPDS time chart versus an example of the inventive modular manufacturing facility and method. At least advantages of delayed capital funding to establish the modular manufacturing facility and shorter time to facility readiness are achieved. Other advantages known by those skilled in the field are obtained.

Figure 6:
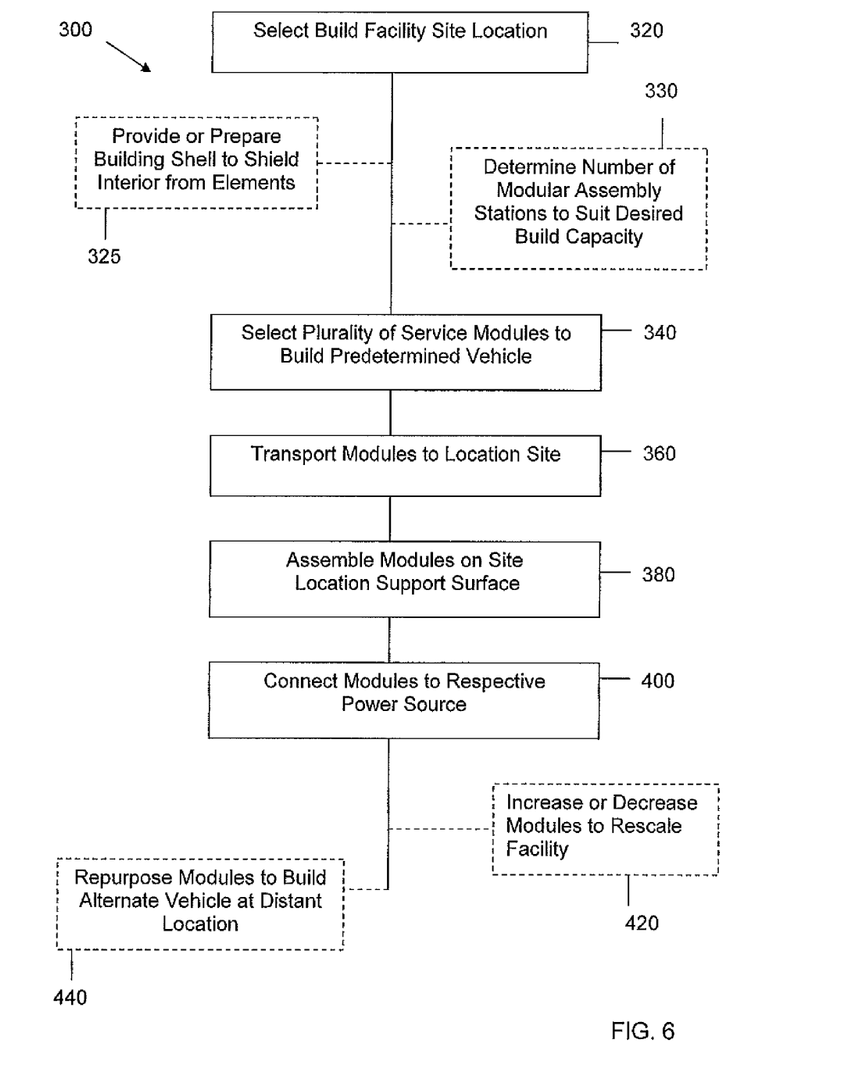
FIG. 6 is a schematic flow chart showing exemplary method or process steps and exemplary sequence of a method of the present invention.

Referring to FIG. 6, a flow chart of an example of steps and a sequence for a method of constructing a modular manufacturing structure or facility 300 for an exemplary use in building vehicular BIW structures is illustrated.

In the example, a first step 320 includes selecting a suitable or desirable location for a modular manufacturing facility to build a predetermined first type or style of vehicle. As described above, the convenience, flexibility and advantages of the inventive facility 100 greatly broadens possible areas where a facility may be relatively quickly constructed at significantly lower initial capital expense.

Depending on the required build capacity and type of vehicle the appropriate service equipment modules 110 are selected in step 340, including any of those described above and others known by those skilled in the art, are selected and packaged in suitable cargo containers 250 or other shipping containers (not shown).

Optionally, and depending on resources available at the selected location, for example if there is an existing building or exterior shell 104, an exterior shell having relatively low infrastructure compared to conventional plants, an exterior shell 104 may be provided or constructured, or improvements made thereto in step 325, for example installation of a light duty truss 198, may be installed.

Optionally, where strategic and discrete modular assembly stations 192 are to be used in facility 100, step 330 is used to determine the number of stations 192 and associated selected modular service equipment 110 that is needed to support the stations 192 or groups of stations.

In step 360 the modules 110 and other required equipment, for example, robots 320, fixtures and tooling (not shown) are transported to the selected site location. Once on site, step 380 involves installing and assembling the respective modules 110, preferably on the existing or resident support surface or floor 150. Depending on the particular service module 110, the modular equipment can be positioned next to assembly line 125 as best needed for operation and function. As described above, an objective is to the greatest extent possible, simply secure the modular equipment to the floor and any existing exterior shell 104 infrastructure to minimize burden and capital expense.

Once assembled independently or integrated with other modules 110, step 400 involves operably connecting the modules to any existing resources at the site, for example, connecting a portable modular electrical substation 130, to a resident source of electrical power. As described, if no resident power source is available, a portable and modular source of power, for example an electric generator would be shipped, installed and connected at the site. This equally applies to other modules, for example welding systems that require a water circulation module 135 for cooling. This interconnection of modules may further include other structures (not shown) to recycle resources used at the facility to reduce energy consumption and use of other resources creating a "green" or as environmentally friendly facility as possible. Once assembled, secured and connected, a fully operational build facility is in place and ready for use. In a preferred process described above, the modular facility is a "plug and build" facility that is independent, or substantially independent, of the exterior shell 104 and surrounding geographic location.

In an optional step 420, when build conditions change, for example build capacity or demand is increased or decreased, the modular facility 100 can be relatively easily scaled to accommodate the change in demand or circumstances. On an increase, additional modular assembly stations 192 and associated modules 110 are packaged, transported, and installed at the site to increase or create parallel assembly lines 125 to support additional build capacity. If a long term reduction is scheduled, modular assembly stations 192 and associated service modules 110 can be disconnected from use.

In an optional step 440, the modular build facility, or selected modules 110 or other portions thereof, may be repurposed or recycled for other uses at the site or in alternate locations for different purposes suitable for the respective modules 110 or other equipment. This may occur if a long term reduction in capacity is scheduled, when capacity at a duplicate facility is increased or termination of the plant operation is slated. In such circumstances, the process of installation and operation set-up is substantially reversed. The scheduled nonused modules 110 are disconnected, packaged and shipped to an alternate geographic location for further use for the useful life of the module equipment. This modular nature and flexibility greatly improves the use of capital equipment resources over conventional designs saving time and cost at both facility sites. It is understood that additional process steps, or a different sequence of the steps known by those skilled in the art may be employed.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A modular reusable manufacturing structure for use in manufacturing and assembling automotive vehicles, the manufacturing structure comprising:
   a substantially continuous support surface;
   a plurality of modular assembly stations selectively positioned about the support surface, at least one of the plurality of assembly stations including:
      a first and a second self-supporting scaffolding structures supported by the support surface without load bearing support by an overhead truss, the first and the second scaffolding structures positioned on opposing sides of a first assembly line path of travel;
      a bridge scaffolding portion positioned between and connected to the first and the second scaffolding structures and defining second assembly line path of travel positioned above a top portion of the scaffolding structure and elevated above the first assembly line path of travel; and
      a plurality of programmable robots supported by at least one of the first or the second scaffolding structures and collectively having a robot path of travel, the robot path of travel extending to the first assembly line path of travel;
   a portable modular conveyor positioned along the first assembly line path of travel and supported by the support surface adapted for moving a partially built device through at least some of the modular assembly stations along an assembly line; and a plurality of portable service modules temporarily connected to and supported by the support surface, the service modules are selectively positioned in one or more of modular assembly stations proximate to the assembly line, the service modules respectively operable to generate and provide resources to operate the manufacturing structure.

2. The manufacturing structure of claim 1 further comprising:

an exterior shell having an upper portion positioned vertically above and defining a ceiling for at least some of the modular assembly stations.

3. The manufacturing structure of claim 2 wherein the shell upper portion further comprises a structural truss having a vertical height of less than about three (3) feet.

4. The manufacturing structure of claim 2 wherein the exterior shell further includes a plurality of exterior walls extending vertically downward from the upper portion at least substantially enclosing an interior of the manufacturing structure from environmental elements.

5. The manufacturing facility of claim 2 wherein the exterior shell upper portion comprises a soft canopy.

6. The manufacturing structure of claim 1 wherein the plurality of portable service modules comprises at least one of an portable electrical substation module, a portable welding water cooling module, a portable pressurized pneumatic supply module, a portable heating ventilation and cooling (HVAC) module, a portable power source or a portable personnel office module.

7. The manufacturing structure of claim 6 wherein the plurality of service modules are positioned directly adjacent one of the first or second scaffolding structures of an assembly station, the service modules preselected for the assembly operation specific to that assembly station.

8. The manufacturing structure of claim 1 wherein each of the portable service modules are integrally formed as commercial shipping containers for shipment to selected locations throughout the world.

9. The manufacturing structure of claim 1 wherein the partially built device is a first passenger vehicle body-in-white (BIW) structure, the assembly stations being configured in content and number to support the build of a the first vehicle body-in-white (BIW) structure, with at least some of the assembly stations being reusable to support the build of a different vehicle body-in-white (BIW) structure.

10. The manufacturing structure of claim 1 further comprising a plurality of first and second scaffolding structures selectively positioned end-to-end forming a sequence of progressive assembly stations along the first assembly line path of travel.

11. The manufacturing facility of claim 1 wherein the plurality of robots are connected to at least one of the first and the second scaffolding structures and suspend downward from the scaffolding toward the support surface thereby not requiring direct mounting to the support surface.

12. The manufacturing facility of claim 1 wherein the modular assembly stations, modular conveyor and portable service modules are sized and configured to package within an interior space of a standard ocean shipping container.

13. The manufacturing facility of claim 12 wherein the ocean shipping container further comprises a first and a second wall section, wherein at least one of the first or the second wall sections is removable and replaceable with a door panel permitting selected ingress and egress into an interior of the container for selected housing of personnel.

14. The manufacturing facility of claim 13 wherein one of the first or the second wall sections is removable and replaceable with a window having an open position and a closed position, the open position allowing selected natural ventilation to an interior of the container.

15. The manufacturing structure of claim 1 wherein at least one of the service modules is adapted to generate one or more of the resources independently from existing resident infrastructure.

* * * * *